US007451195B1

(12) United States Patent
Seligmann

(10) Patent No.: US 7,451,195 B1
(45) Date of Patent: Nov. 11, 2008

(54) METHOD AND SYSTEM FOR OPERATING A PDA FOR USE WITH AN IP PHONE DEVICE

(75) Inventor: Dorée D. Seligmann, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/192,273

(22) Filed: Nov. 16, 1998

(51) Int. Cl.
*G06F 13/00* (2006.01)

(52) U.S. Cl. ........................... 709/220; 709/227

(58) Field of Classification Search ............... 707/201, 707/200, 203; 455/556; 709/220–222, 227, 709/228; 715/744–747
See application file for complete search history.

(56) References Cited

U.S. PATENT DOCUMENTS

| | | | | |
|---|---|---|---|---|
| 5,497,339 A | * | 3/1996 | Bernard | 708/109 |
| 5,522,089 A | * | 5/1996 | Kikinis et al. | 710/73 |
| 5,633,920 A | | 5/1997 | Kikinis et al. | |
| 5,666,553 A | * | 9/1997 | Crozier | 707/540 |
| 5,684,990 A | * | 11/1997 | Boothby | 707/203 |
| 5,719,926 A | | 2/1998 | Hill | |
| 5,799,068 A | * | 8/1998 | Kikinis et al. | 379/93.06 |
| 5,835,732 A | * | 11/1998 | Kikinis et al. | 710/303 |
| 5,953,322 A | * | 9/1999 | Kimball | 370/328 |
| 6,009,336 A | * | 12/1999 | Harris et al. | 455/566 |
| 6,009,469 A | * | 12/1999 | Mattaway et al. | 709/227 |
| 6,035,214 A | * | 3/2000 | Henderson | 455/556 |
| 6,108,704 A | * | 8/2000 | Hutton et al. | 709/227 |
| 6,119,179 A | * | 9/2000 | Whitridge et al. | 710/72 |
| 6,161,133 A | * | 12/2000 | Kikinis | 709/220 |
| 6,161,134 A | * | 12/2000 | Wang et al. | 709/220 |
| 6,226,678 B1 | * | 5/2001 | Mattaway et al. | 709/230 |
| 6,243,376 B1 | * | 6/2001 | Ng et al. | 370/352 |
| 6,243,398 B1 | * | 6/2001 | Kahane et al. | 370/522 |
| 6,266,539 B1 | * | 7/2001 | Pardo | 455/556 |
| 6,359,892 B1 | * | 3/2002 | Szlam | 370/401 |
| 6,389,124 B1 | * | 5/2002 | Schnarel et al. | 379/142.01 |
| 6,446,127 B1 | * | 9/2002 | Schuster et al. | 709/227 |
| 6,519,242 B1 | * | 2/2003 | Emery et al. | 370/338 |
| 6,529,501 B1 | * | 3/2003 | Zhao et al. | 370/353 |
| 6,647,103 B2 | * | 11/2003 | Pinard et al. | 379/110.01 |
| 2005/0015516 A1 | * | 1/2005 | Ju | 709/250 |

OTHER PUBLICATIONS

Ismail Dalgic et al.; True Number Portability and Advanced Call Screening in a SIP-Based IP Telephony System; IEEE Communications Magazine; pp. 96-101; Jul. 1999.*

(Continued)

*Primary Examiner*—Kenneth R Coulter

(57) ABSTRACT

A personal digital assistant (PDA) stores a list of available phone features and policies and selects certain phone features and policies from the stored features and policies. When connected with an internet protocol (IP) phone device, the PDA downloads the selected phone features and policies to the IP phone device in a new location, so that the IP phone device can be operated as the user's personal phone. The PDA verifies the user's identity to ensure that only authorized individuals have access to the IP phone device or IP-PBX. Also, the PDA, with phone features and policies stored therein, visually displays phone configurations and mappings to an administrator of the IP-PBX for verifying the actual configuration of the phone system based on the stored configuration.

43 Claims, 5 Drawing Sheets

OTHER PUBLICATIONS

Polle T. Zellweger et al.; An Overview of the Etherphone System and Its Applications; Proc. of the 2nd IEEE Conference on Computer Workstations; pp. 160-168; Mar. 1988.*

U.S. Appl. No. 60/098,187; Derek S. Graham; filed on Aug. 26, 1998; (related to U.S. Pat. No. 6,389,124).*

* cited by examiner

METHOD AND SYSTEM FOR OPERATING A PDA FOR USE WITH AN IP PHONE DEVICE

TECHNICAL FIELD

The present invention relates to a method and system for operating a personal digital assistant (PDA) for use with an Internet Protocol (IP) phone or other communication devices.

BACKGROUND OF THE INVENTION

Phone features known in the art include a Reach Me feature, a Simple Call Forwarding feature, and an International Call feature. The Reach Me feature forwards a call placed to the user's telephone number to different locations and phone lines, which may be at different locations, designated by the user. The Simple Call Forwarding feature forwards a call placed to the user's telephone number to one designated phone line. The International Call feature allows the user to place international calls using only a five-digit country code followed by a local number. Phone polices are phone numbers and phone line numbers that are used to implement the phone features. Phone line numbers represent different phone lines/wires used in phone operations. Generally, offices and hotels employ different types of phones features and policies.

To implement these phone features and policies, switches such as Private Branch Exchange (PBX) communicate with phones, other switches and telecommunication systems. Typically, a console connected to the switch provides the interface by which an administrator can load and configure phone features and policies. Users can program phone features and policies only by using their phones.

In setting up the user's personal phone features and policies, the user designates certain phone features and policies per telephone number, which may be tied to a designated location, e.g., a house, an office, or a cell phone. The user has to use the phone tied to that location to operate in accordance with the user's personal phone features and policies.

From other than the designated phone location the user does not have direct access to his personal phone features and policies because the features and policies are tied to the designated phone location. Therefore, if the user uses a phone at other than the designated phone location, the user is limited to the features and policies of that phone, and so the user must follow often different and sometimes complicated instructions to operate the new phone. For example, if the user desires to place a call from a hotel, the user must follow the hotel's instructions to communicate with outsiders. Often, he must pass through the hotel operator before he can place an outside call, and outsiders must pass through the hotel operator to speak with the user in the hotel.

Typically, a set of features and policies are bound to a specific phone which belongs to a particular owner and requires owner's permission for use and modification. Often, a user is not permitted to have access to program the specific phone based on the user's desired phone features and policies.

SUMMARY OF THE INVENTION

I have recognized that it is inconvenient, time consuming, expensive, and inefficient for the user to receive and place calls once the user leaves his home, office, or other designated areas because the phones available to him outside of these areas do not accord with his personal phone features and phone policies. The foregoing problems can be avoided, in accordance with the principles of the invention, by a) storing a list of available phone features and policies in a personal digital assistant (PDA), b) selecting certain phone features and policies from the stored phone features and policies, c) connecting the PDA with an IP phone device, and d) downloading the selected phone features and policies to the IP phone device in a new location, so that the IP phone device can be operated as the user's personal phone. Furthermore, I have recognized that the PDA can be used to verify the user's identity to ensure that only authorized individuals have access to the IP phone device or Internet Protocol-Public Branch Exchange (IP-PBX), and that the PDA can act as the display for the IP phone device. I have also recognized that the PDA with phone features and policies stored therein can visually display phone configurations and mappings to an administrator of the IP-PBX for verifying the actual configuration of the phone system based on the stored configuration.

The present system and method according to the principles of the invention are appropriate for emerging technologies of IP telephony encompassing IP phones and IP-PBXs. Furthermore, the PDA can provide a software layer so that a mapping between the user's preferences and the switches settings is done automatically, e.g., by using auto detectors. Moreover, if the phone's features and policies are not evident, the PDA can be used to display the current phone features and policies of the phone.

DETAILED DESCRIPTION

Figure 1:
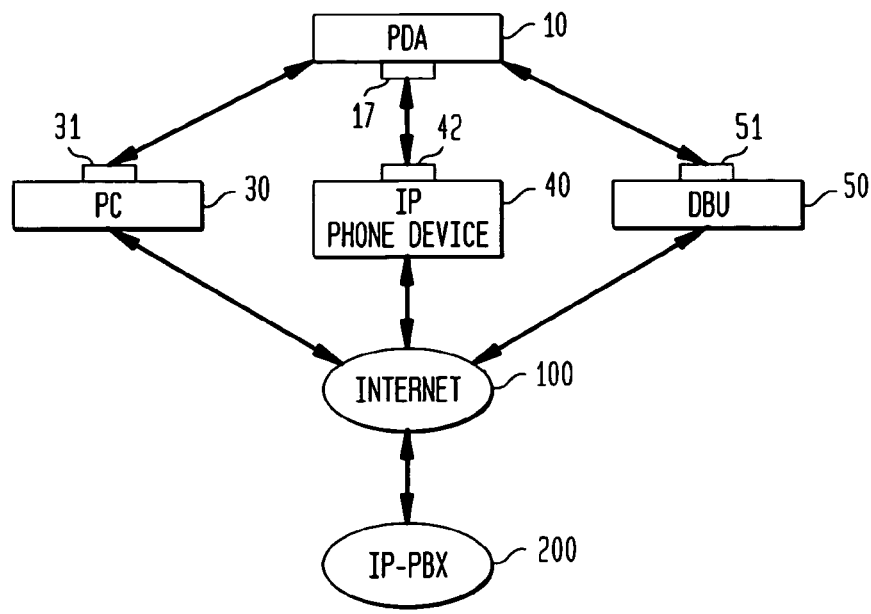
FIG. 1 shows a block diagram of an exemplary PDA/IP phone system according to the principles of the invention.

FIG. 1 shows a block diagram of an exemplary PDA/IP phone system in accordance with the principles of the invention. According to the principles of the invention, any arbitrary IP phone device can operate as the user's personal phone. The user is familiar with placing and receiving calls using his own phone so that, with the present PDA/IP phone system, the user in remote locations initiates and receives calls without having to follow new and complicated instructions. The standard PDA objects, such as the address book, calendar, and calculator, stored in a PDA 10 can be displayed for the user to place calls without having to memorize phone numbers. The user can select a phone number among the displayed phone numbers, and the PDA 10 can automatically initiate the call. Any calls (numbers) the user receives through an IP phone/communication device 40 can be stored in the PDA 10. Further, the PDA 10 is used to verify the user's identity so as to provide a secure and reliable IP phone system.

Also, the user can transfer his personal phone features and policies stored in the PDA 10 to an IP-PBX. This way, the user can design his phone features and policies using the PDA 10.

Moreover, an administrator of the IP-PBX uses the PDA 10 as a verification tool. The administrator stores phone features and policies, and devices/numbers of the customers in his PDA 10. The PDA 10 visually displays the stored information including the switch and wire configurations, etc. on its screen to the administrator. Using the displayed information, the administrator verifies whether the actual wire/switch configuration corresponds to the stored information.

In addition, a call center which routes incoming calls to various agents can be augmented with the PDA 10 to serve as a verification and programming tool. The call centers route calls based on a number of different criteria including the receipt priority and preferred customer list. Using the PDA 10, call center agents can log in after the authentication and verification where the call center verifies the identify of the call center agents who desire to access the system, and the call center automatically routes calls to that agent. In this way, agent's features and policies will be automatically associated with the phone the particular agent is using.

More particularly, as shown in FIG. 1, the PDA/IP phone system according to the principles of the invention includes a PDA 10 connectable to a personal computer (PC) 30, an IP phone device 40, and a docking base unit (DBU) 50. The basic hardware of the PDA 10 is conventional, and the PDA 10 communicates data with the PC 30 and the IP phone device 40 through serial ports 31 and 42 of these devices. The PDA 10 is also connectable to other types of communication devices, such as a cell phone, a fax machine, and an advanced pager. The PC 30 and the IP phone device 40 have access to the Internet 100 through known protocols, and, through the Internet 100, the PDA 10, the PC 30 and IP phone device 40 have access to an IP-PBX 200.

The IP-PBX 200 is a known switch system that controls phone operations and associated devices, with an application program interface (API) which allows the functionality and settings of the IP-PBX 200 to be accessible from the Internet 100 by devices including the PDA 10, the IP phone 40, etc. The IP phone device 40 is an IP phone known in the art, e.g., as disclosed in U.S. Pat. No. 5,633,920. The PC 30 is a standard PC with a modem known in the art. Any IP phone device provides standard phone functionality, such as, generating dial tones, busy signals, etc. The PDA 10 generally includes the DBU 50 built in, but the DBU 50 may be a separate unit from the PDA 10 as shown in FIG. 1.

Figure 2:
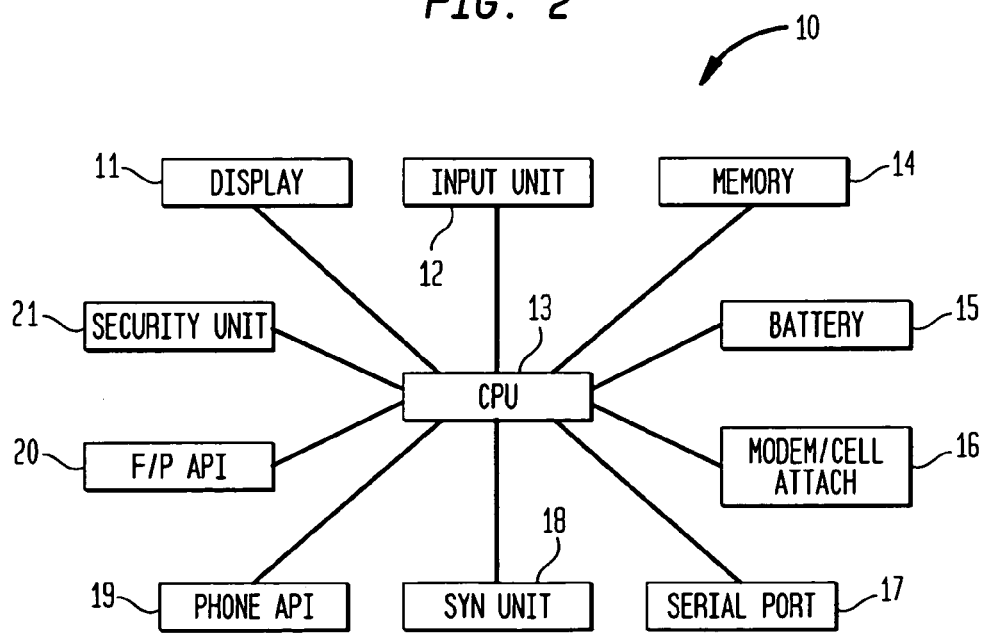
FIG. 2 shows a block diagram of an exemplary PDA of the PDA/IP phone system shown in FIG. 1.

FIG. 2 shows a block diagram of the PDA 10 according to the principles of the invention. As shown in FIG. 2, the PDA 10 includes a CPU 13 connected to a display 11, an input unit 12, a memory 14, a battery 15, a modem and cell phone attachments 16, a serial port 17 for directly connecting with the serial port 31 of the PC 30 or the like, and a synchronization unit 18.

The CPU 13 controls operations of the components of the PDA 10. The memory 14 stores software for implementing the standard PDA functions, such as an address book for storing names, mailing addresses, phone numbers, and e-mail addresses; a calculator; a datebook for setting up appointments; and a memo pad for keeping a to-do list. Unlike in conventional PDAs, the memory 14 also stores the user's identity information (user profile), a list of different types of phone features and policies, and phone numbers/devices associated with phone services. Such data can be downloaded or uploaded to and from the PC 30 through the serial ports 17 and 31, whose operations are known in the art.

The input unit 12 is used to enter information, e.g., user's identity information and e-mail addresses, into the PDA 10. The input unit 12 may be a touch sensitive screen, a keypad with an input pen, or other input device known in the art. The inputted information is stored in the memory 14. Under control of the CPU 13, the display 12 visually displays inputted data and stored information. The battery 15 supplies electrical power to all of the components of the PDA 10, and the modem and cell phone attachments 16 provide a direct connection to the Internet 100 and cell phones. The serial port 17 transmits and receives data to and from the PC 30, the IP phone device 40, or other communication devices. The synchronization unit 18 includes software known in the art for allowing data recognition and communication between the PDA 10 and other communication devices. That is, the known synchronization software is used to establish communication between the PDA 10 and the PC 30 or IP phone device 40. The serial port 17 can be a RS232 type port and is connectable to the input port of a CPU, a modem, cell phone attachments, a phone jack, or other communication devices. Therefore, the principles of the invention can be carried out using the software and hardware already existing in the art.

The PDA 10 is also provided with a PHONE API (Application Program Interface) 19 for defining communication between the PDA 10 and the phone functionality, and a FEATURE/POLICY API 20 for setting communication between the PDA 10 and phone features and policies. These APIs, loaded into the PDA 10, represent software which may be stored in the memory 14 or in other memories, and provide the interface between the PDA 10 and another telecommunication devices so that the PDA 10 recognizes data from the connected telecommunication device and vice versa.

The PDA 10 also includes a security unit 21 for identifying the user, telephone devices and PCs to be connected with the PDA 10. The current user inputs user identification data using the input unit 12 of the PDA 10. The security unit 21 of the PDA 10 compares this data with the user profile stored in the memory 14 of the PDA 10 under control of the CPU 13, and verifies the user's identity. If there is a match between the user supplied information and the stored user data, the current user has an access to the phone features and policies stored in the PDA 10. However, if there is no match between the user supplied information and the stored user data, the current user is denied access to the phone features and policies stored in the PDA 10. Thus, the security unit 21 ensures only authorized access to the PDA 10.

Figure 3:
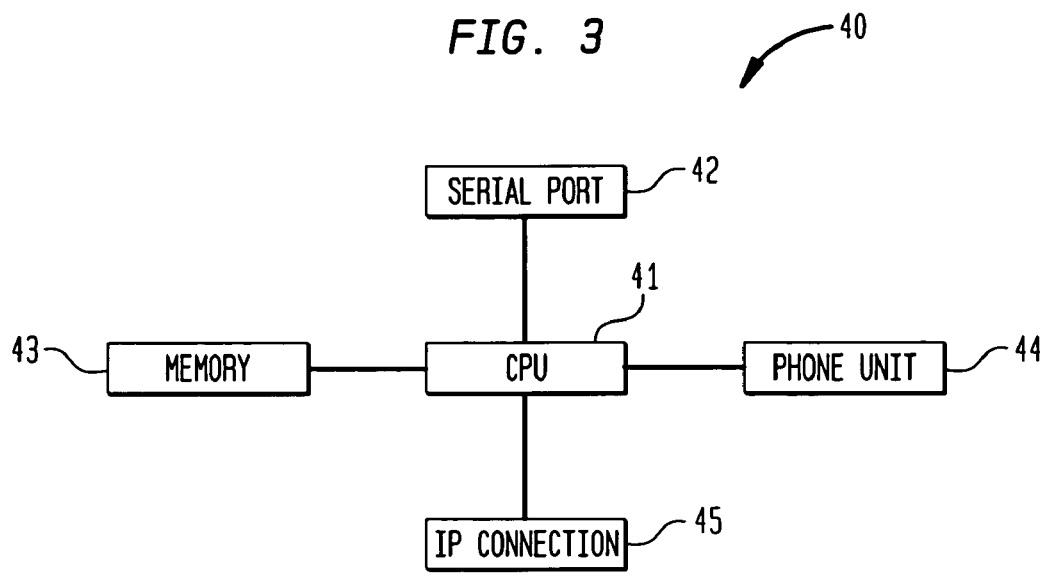
FIG. 3 shows a block diagram of an exemplary IP phone device of the PDA/IP phone system shown in FIG. 1.

FIG. 3 shows a block diagram of the IP phone device 40 used in the system of FIG. 1. As shown in FIG. 3, the IP phone device 40 includes a CPU 41, a serial port 42, a memory 43, a phone unit 44, and an IP connection 45, all connected to each other. The memory 43 stores data transmitted to the IP phone device 40 via the serial port 42 under control of the CPU 41, which is executing software, e.g., operating systems and applications that are stored, in whole or in part, in the memory 43. The phone unit 44 includes a keypad, a speaker and a microphone that operate under control of the CPU 41 to provide the phone functionality. The PDA data stored in the memory 14 of the PDA 10 are accessible by the IP phone device 40 through the serial port 42. In addition, a camera, a display, a keyboard, a magnetic/smart cart reader, or a built-in docking base unit may be optionally provided as part of, or may interface with, the IP phone device 40. The operation of each of these optional components is known in the art.

The IP phone device 40 uses packet transmission over the Internet 100 and its extensions, e.g., intranets and modem links, rather than traditional circuit switching, to send digital data (voice) to other IP phone devices or PCs. As a result, it is inexpensive to place long distance calls on the IP phone device 40. The IP phone device 40 can also communicate with conventional public switched phone networks (PSTN) via other devices, such as, line gateways on the Internet 100, that connect directly to the PSTN. For example, the user connects to an Internet telephony gateway by, e.g., inputting a special number or an e-mail address through his IP phone device 40. The Internet telephony gateway receives the call and requests the user to input the phone number of the desired party. The Internet telephony gateway then searches for a second Internet telephony gateway which is local to the inputted phone number through the Internet 100. The second Internet telephony gateway then places a call according to the inputted phone number on the receiving party's IP phone device or PC. The receiving party is then able to communicate with the caller through the Internet 100.

Furthermore, the IP phone device 40 may be used for transmission of voice, text, images, etc. over the Internet 100.

Figure 4:
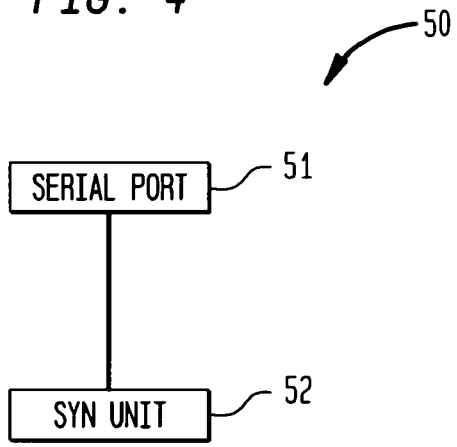
FIG. 4 shows a block diagram of an exemplary docking base unit (DBU) of the PDA/IP phone system shown in FIG. 1.

FIG. 4 shows a block diagram of the DBU 50 of the system shown in FIG. 1 according to the principles of the invention. As shown in FIG. 4, the DBU 50 includes a serial port 51 and a synchronization (SYN) unit 52 with known synchronization software. Although some known PDAs already have the DBU 50 built in, the DBU 50 may be a separate unit from the PDA 10. Using the synchronization unit 52, communication between the PDA 10 and other communication devices can be established.

IP Phone Operation

Figure 5:
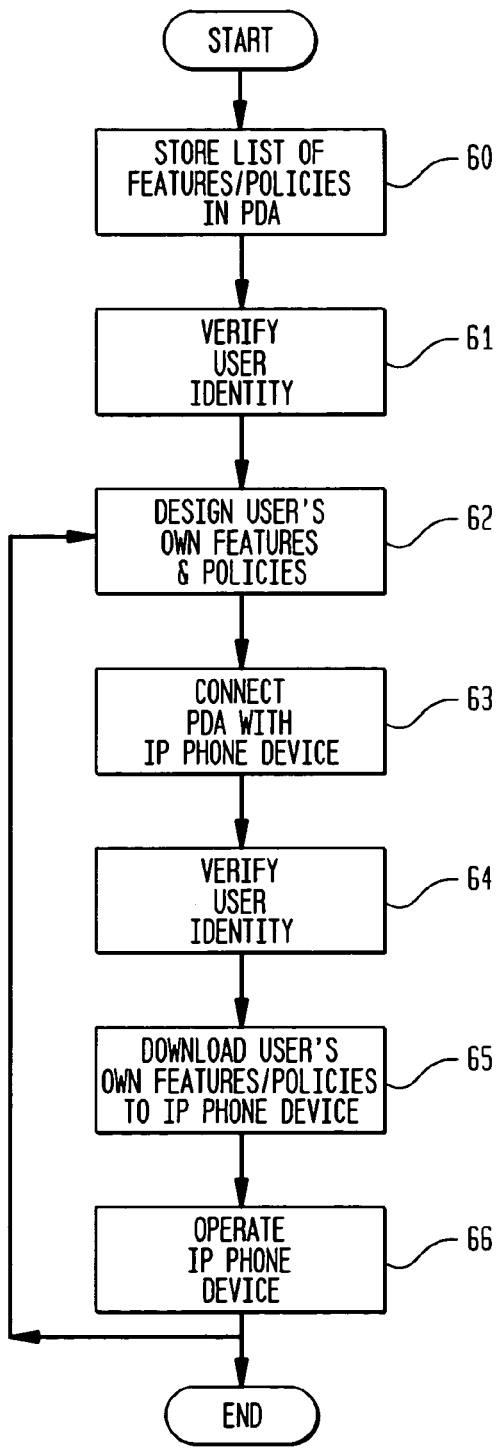
FIG. 5 shows a flowchart of a particular exemplary method for implementing the invention.

A method of operating a PDA with an IP phone device according to the principles of the invention will be described below referring to FIG. 5.

In Step 60, a list of available phone features and policies are stored in the memory 14 of the PDA 10. At this point, the PDA 10 can perform the standard PDA functions in operation. For example, directory information including a) the user profile, b) the phone numbers and c) e-mail addresses of others has been input, e.g., via the input unit 12, and stored in the memory 14 of the PDA 10. The PDA 10 can be connected to the PC 30 or the Internet 100, via the serial port 17 or modem and cell phone attachments 16 of the PDA 10, to download software providing different types of phone features and policies into the PDA 10. The IP-PBX 200 also has software corresponding to different types of phone features and policies, which can be downloaded and stored in the memory 14 of the PDA 10, or the PDA 10 may come preprogrammed with the phone features and policies.

In optional Step 61, the current user inputs user identification data using the input unit 12 of the PDA 10. The security unit 21 of the PDA 10 compares this data with the user profile stored in the memory 14 of the PDA 10 under control of the CPU 13, and verifies the user's identity. If there is a match between the inputted and stored information, the process continues to the next step. Otherwise, the process ends and the current user is denied access to the phone features and policies stored in the PDA 10. The security unit 21 ensures that only the authorized individuals have access to the phone features and policies.

In Step 62, the user programs the PDA 10 with his personal phone features and policies using the display 11 and input unit 12 of the PDA 10. A list showing all the available phone features and policies is displayed on the display 11 of the PDA 10. The user selects, via the input unit 12, certain features from the list, e.g., the Reach Me, the Simple Call Forwarding, and the International Call features, stores them in the memory 14 as the user's personal phone features and policies. The user may also input additional information, such as phone numbers, to implement the selected phone features. Likewise, the user can delete and modify the existing phone features and policies of the user.

When the user travels to a remote location and finds an IP phone device, such as the IP phone device 40, the user connects the PDA 10 with the IP phone device 40, e.g., by connecting the serial port 17 of the PDA 10 to the serial port 42 of the IP phone device 40 in Step 63. This IP phone device 40 is not necessarily the user's, but is an arbitrary IP phone available at the remote location. The IP phone device 40 may be connected to the Internet 100 through a modem, a wireless modem or other known device.

Once the PDA 10 is connected to the IP phone device 40, the user identity verification step is carried out as in Step 64. This step is similar to Step 61 and ensures that only the properly authorized users have access to the IP phone device 40. This feature is optional, but can be advantageous when the PDA 10 is lost or stolen since the finder or thief cannot access the IP hone device 40 without the true owner's identification data.

Once the user's identity has been established, the phone features and policies specified in Step 62 are downloaded to the IP phone device 40, e.g., through the serial ports 17 and 42 of the PDA 10 and the IP phone device 40, respectively, in Step 65. The IP-PBX 200 receives this information from the IP phone device 40 through the Internet 100 or similar IP-type networks, and operates the phone system according to this information. Then in Step 66, the user is able to operate the IP phone device 40 according to the user's personal phone features and policies. If the user wishes to modify the user's phone features and policies after the operation of the IP phone device 40 in Step 66, the process returns to Step 62 and the user carries out Steps 62, 64, 65 and 66. Accordingly, the user may specify his personal phone features and policies (Step 62) after the PDA 10 has been connected to the IP phone device 40 (Step 63).

According to this method, the user can temporarily program any available IP phone/communication device regardless of location. The IP phone device 40 functions as the user's personal phone, and the user can freely initiate and receive calls through the IP phone device 40, just like he does on his home or office phone. That is, the IP phone device 40 now operates under the user's selected phone features and policies. Any caller who wishes to call the user can reach the user without knowing the exact location of the user or the phone number corresponding to that location.

IP-PBX Operation

Figure 6:
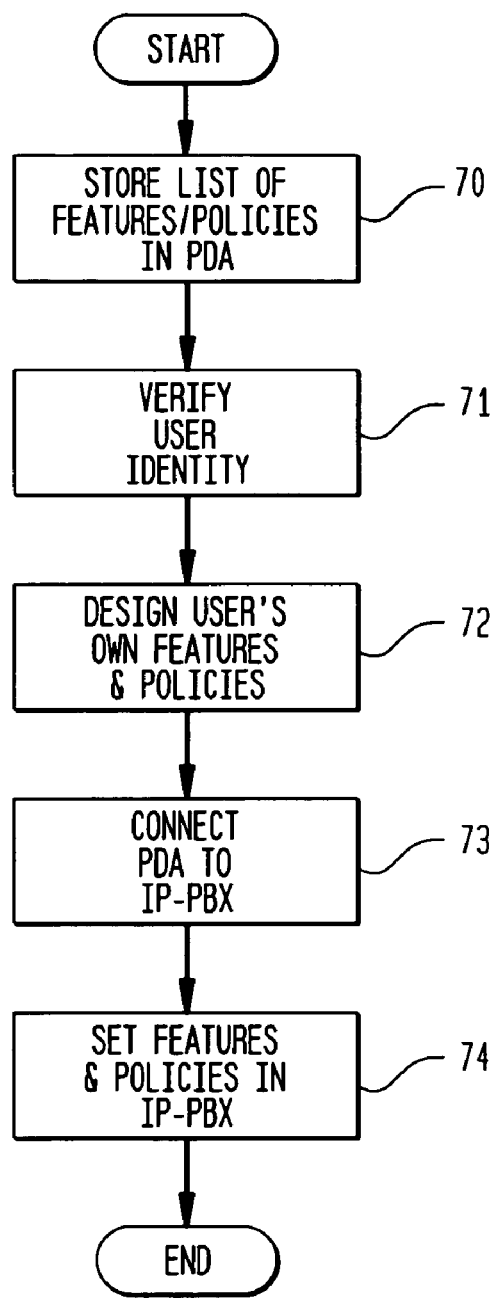
FIG. 6 shows a flowchart of another exemplary method for implementing the invention.

According to an aspect of the invention, the user can connect the PDA 10 directly to the IP-PBX 200 through the Internet 100, and more permanently modify his phone features and policies for future usage. The IP-PBX 200 is known in the art, e.g., as disclosed in U.S. Pat. No. 5,519,772. FIG. 6 shows a flowchart showing this method according to this aspect of the invention.

More specifically, as shown in FIG. 6, phone features and policies are stored in the memory 14 of the PDA 10 in Step 70. The security unit 21 compares the user's identity information stored in the memory 14 with the current user's identification data input via the input unit 12 in Step 71. If there is a match between the user supplied information and the stored information, the process continues to the next step. Otherwise, the user is denied access to the phone features and policies stored in the memory 14 of the PDA 10. Steps 70 and 71 are similar to Steps 60 and 61 shown in FIG. 5.

In Step 72, the user selects, via the input unit 12 of the PDA 10, certain desired phone features and policies from the list of features and policies shown on the display 11 of the PDA 10. This step is similar to Step 62 shown in FIG. 5. The user can input additional information as needed to implement the selected features, and stores the resulting features and policies in the memory 14 of the PDA 10. Then, the PDA 10 is connected to the IP-PBX 200 via the Internet 100 in Step 73, e.g., through the modem and cell phone attachments 16, the PC 30, or other communication device. The user's phone features and policies specified in Step 72 are uploaded to the IP-PBX through the Internet 100, and the IP-PBX controls the user's phone system according to the received phone features and policies in Step 74. The user may design his personal phone features and policies (Step 72) after the PDA has been connected to the IP-PBX (Step 73), and the user identity verification (Step 71) may be performed after the PDA 10 has been connected to the IP-PBX (between Steps 73 and 74).

Verification Operation

Figure 7:
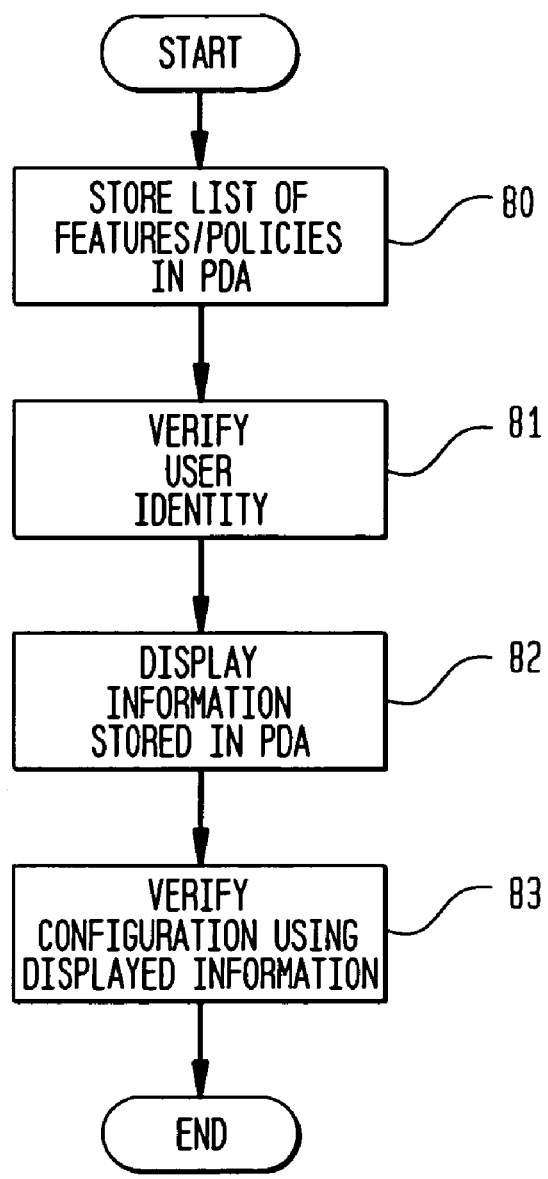
FIG. 7 shows a flowchart of still another exemplary method for implementing the invention.

If the user is an administrator of the IP-PBX, the PDA 10 according to the principles of the invention can be used as a verification tool as shown in FIG. 7.

In Step 80, the administrator downloads phone features and policies, particularly, phone configurations and mappings corresponding thereto, of different customers into his PDA 10 from a main IP-PBX terminal or other designated systems. The user identity verification operation is performed in Step 81 where the identity of the administrator is verified. Steps 80 and 81 are similar to Steps 70 and 71 shown in FIG. 6. In Step 82, once the administrator's identity has been verified, the administrator can move to a location where the actual phone lines, switches, etc. are located, selects certain phone configurations and mappings for the desired customers using the input unit, and displays the selected phone configurations and mappings on the display 11 of the PDA 10. In Step 83, the administrator sees the actual configuration and mappings between the switches and phone lines, etc., and compares them with the displayed information to verify the accuracy of the actual configuration and mappings of the phone system. Further, the administer who is visiting individual homes or offices can connect his PDA 10 to the IP-PBX 200 via a modem or the like, and can change or correct the phone features and policies on site, as needed.

Although the phone features and policies have been described in connection with the principles of the present invention, the PDA/IP phone system and method according to the invention can be used in connection with other features and policies.

The foregoing merely illustrates the principles of the invention. It will thus be appreciated that those skilled in the art will be able to devise various arrangements which, although not explicitly described or shown herein, embody the principles of the invention and are thus within its spirit and scope.

I claim:

1. A Personal Digital Assistant (PDA), comprising:
    a memory for storing a list of phone features downloaded from a first IP phone device to the PDA; and
        software stored in the memory for allowing a first user to select a first set of phone features from the list of phone features, allowing the first user to store, within the PDA, the selected phone features as the first user's personal phone features, allowing the first user to download the first user's personal phone features to a second IP phone device, and allowing the first user to operate the second IP phone device according to the first user's personal phone features from the PDA such that the first and second IP phone devices operate in a same manner based on the first user's personal phone features so long as each has the first user's personal phone features loaded therein.

2. The Personal Digital Assistant (PDA) as defined in claim 1, wherein
    the memory includes prestored identification data for the first user, and said PDA further includes a security unit for verifying the identity of the first user based on the prestored identification data.

3. The PDA as defined in claim 1 wherein said software includes a feature/policy application program interface (API), said feature/policy API being used to interface the PDA with the first user's personal phone features.

4. The PDA as defined in claim 1 wherein said software includes a phone application program interface (API) for interfacing the PDA with phone functionality of the first and second IP phone devices.

5. The PDA as defined in claim 1 further comprising:
    a synchronization unit for synchronizing the PDA with the second IP phone device.

6. The Personal Digital Assistant (PDA) as defined in claim 1 wherein the memory further stores prestored identification data for the first user.

7. The PDA as defined in claim 6 further comprising:
    a security unit for verifying the identity of the first user based on the prestored identification data.

8. The Personal Digital Assistant (PDA) as defined in claim 1, further comprising:
    a display for displaying phone configurations in at least one of the second IP phone device and the IP-PBX based on the first user's personal phone features stored in the memory.

9. The PDA as defined in claim 8 wherein the memory also stores prestored identification data of the first user.

10. The PDA as defined in claim 9 further comprising:
    a security unit for verifying the identity of the first user based on the prestored identification data.

11. A Personal Digital Assistant (PDA) comprising:
    first means for storing a list of phone features downloaded from a first IP phone device to the PDA;
    second means for selecting a first set of phone features from the list of phone features, downloading the first user's personal phone features to a second IP phone device, and operating the second IP phone device according to the first user's personal phone features from the PDA such that the first and second IP phone devices operate in a same manner based on the first user's personal phone features so long as each has the first user's personal phone features loaded therein; and
    third means for storing, within the PDA, the selected phone features as the first user's personal phone features.

12. The PDA as defined in claim 11 wherein the first means also stores identification data for the first user.

13. The PDA as defined in claim 12 further comprising:
    security means for verifying the identity of the first user based on the prestored identification data.

14. The PDA as defined in claim 11 wherein the first means stores a feature/policy application program interface (API) used to interface the PDA with the first user's personal phone features.

15. The PDA as defined in claim 11 further comprising:
    connection means for connecting the PDA to an IP-PBX for communication.

16. The PDA as defined in claim 11 wherein the first means stores a phone application program interface (API) used to interface the PDA with phone functionality of the first and second IP phone devices.

17. The PDA as defined in claim 11 further comprising:
synchronization means for synchronizing the PDA with the second IP phone device.

18. A method of operating a hardware-based IP phone system comprising the steps of:
downloading a list of phone features from a first IP phone device to the PDA;
selecting a first set of phone features from the list of phone features and storing, within the PDA, the selected phone features as the first user's personal phone features;
connecting the PDA to a second IP phone device and downloading the first user's personal phone features to the second IP phone device; and
operating the second IP phone device according to the first user's personal phone features from the PDA such that the first and second IP phone devices operate in a same manner based on the first user's personal phone features so long as each has the first user's personal phone features loaded therein.

19. The method as defined in claim 18, wherein said operating step includes the step of:
synchronizing the PDA with the second IP phone device.

20. The method of as defined in claim 18, further comprising the steps of:
prestoring identity information of the first user in the PDA; and
verifying, in the PDA, the identity of the first user based on the prestored identity information before selecting the first set of phone features.

21. The method as defined in claim 20 wherein said operating step includes the step of:
receiving and initiating calls through the second IP phone device according to the first user's personal phone features.

22. A computer program embodied on a computer-readable storage medium of a Personal Digital Assistant (PDA), comprising:
a first source code segment for storing a list of phone features downloaded from a first IP phone device to the PDA; and
a second source code segment for selecting a first set of phone features from the list of phone features, the second source code segment for storing, within the PDA, the selected phone features as the first user's personal phone features, downloading the first user's personal phone features to a second IP phone device, and the second source code segment for operating the second IP phone device according to the first user's personal phone features from the PDA such that the first and second IP phone devices operate in a same manner based on the first user's personal phone features so long as each has the first user's personal phone features loaded therein.

23. The computer program of claim 22 further comprising:
a third source code segment for storing identification data for the first user and verifying the identity of the first user based on the prestored identification data.

24. The computer program of claim 22 further comprising:
a third source code segment for interfacing the PDA with the first user's personal phone features.

25. The computer program of claim 22 further comprising:
a third source code segment for interfacing the PDA with phone functionality of the second IP phone device for communication.

26. The computer program of claim 22 further comprising:
a third source code segment for communicating with an IP-PBX.

27. The computer program of claim 22, wherein the second source code segment is also for displaying phone configurations in at least one of the IP phone devices and an IP-PBX based on the stored first user's personal phone features.

28. The computer program as defined in claim 27 wherein the first source code segment prestores identification data of the first user within the PDA.

29. The computer program as defined in claim 28 further comprising:
a third source code segment for verifying the identity of the first user based on the prestored identification data.

30. A method of operating a hardware-based IP phone system comprising the steps of:
downloading a list of phone features from a first IP phone device to the PDA;
selecting a first set of phone features from the list of phone features and storing the selected phone features within the PDA as the first user's personal phone features;
connecting the PDA to an IP-PBX and uploading the first user's personal phone features to the IP-PBX; and
downloading phone features from the IP-PBX to a second IP phone device such that the first and second IP phone devices operate in a same manner based on the first user's personal phone features so long as each has the first user's personal phone features loaded therein.

31. The method as defined in claim 30, wherein the PDA is connected to an Internet Protocol-Public Branch Exchange (IP-PBX) via the second IP phone device.

32. The method as defined in claim 30, wherein the PDA is connected to the IP-PBX through the Internet.

33. The method as defined in claim 30 further comprising the steps of:
prestoring identification data of the user in the PDA; and
verifying, before said selecting step, the identity of the first user based on the prestored identification data.

34. The method as defined in claim 30, further comprising the steps of:
displaying phone configurations in a telecommunication system based on the selected phone features stored within the PDA.

35. The method as defined in claim 34 further comprising the steps of:
prestoring identification data of first user within the PDA; and
verifying the identity of the first user based on the prestored identification data.

36. The method as defined in claim 34 further comprising at least one of the following steps:
deleting certain phone features stored within the PDA; and
modifying the phone features stored within the PDA.

37. A Personal Digital Assistant (PDA) for communicating with an Internet Protocol-Public Branch Exchange (IP-PBX), comprising:
means for allowing selecting of a first set of phone features from the list of phone features, allowing storing the selected phone features within the PDA as the first user's personal phone features, allowing connecting the PDA to an IP-PBX and allowing uploading the first user's personal phone features to the IP-PBX, and allowing downloading phone features from the IP-PBX to a second IP phone device such that the first and second IP phone devices operate in a same manner based on the first user's personal phone features so long as each has the first user's personal phone features loaded therein at least one of the first user's personal phone features being implemented in a telecommunication system.

38. The PDA as defined in claim 37 wherein the connection means includes a modem for connecting the PDA to the IP-PBX.

39. The Personal Digital Assistant (PDA) as defined in claim 37, further comprising:
storage means for prestoring identification data of the first user.

40. The PDA as defined in claim 39 further comprising:
security means for verifying the identity of the first user based on the prestored identification data.

41. The Personal Digital Assistant (PDA) as defined in claim 37, further comprising:
display means for displaying IP phone configurations in a telecommunication system based on at least a portion of the first user's personal phone features.

42. The PDA as defined in claim 41 wherein the means for storing prestores identification data of the first user.

43. The PDA as defined in claim 42 further comprising:
security means for verifying the identity of the first user based on the prestored identification data.

* * * * *